United States Patent [19]

Voigt et al.

[11] 4,387,081
[45] Jun. 7, 1983

[54] PROCESS FOR THE PRODUCTION OF HYDROGEN CYANIDE

[75] Inventors: Carl Voigt, Rodenbach; Peter Kleinschmit; Gerd Schreyer, both of Hanau; Gerhard Sperka, Alzenau, all of Fed. Rep. of Germany

[73] Assignee: Degussa AG, Frankfurt, Fed. Rep. of Germany

[21] Appl. No.: 304,049

[22] Filed: Sep. 21, 1981

[30] Foreign Application Priority Data

Sep. 27, 1980 [DE] Fed. Rep. of Germany ....... 3036599

[51] Int. Cl.$^3$ ............................................... C01C 3/02
[52] U.S. Cl. ............................................................ 423/376
[58] Field of Search ................................. 423/375, 376

[56] References Cited

U.S. PATENT DOCUMENTS

| | | | |
|---|---|---|---|
| 1,934,610 | 11/1933 | Wheeler | 423/375 |
| 1,982,407 | 11/1934 | Wheeler | 423/375 |
| 2,006,981 | 7/1935 | Andrussow | 423/376 |
| 2,531,287 | 11/1950 | Merrill | 423/376 |
| 2,706,675 | 4/1955 | Chatelain | 423/376 |
| 2,861,870 | 11/1958 | Deyrup et al. | 423/376 |

FOREIGN PATENT DOCUMENTS

| | | |
|---|---|---|
| 1143497 | 2/1963 | Fed. Rep. of Germany ...... 423/376 |
| 2350212 | 4/1974 | Fed. Rep. of Germany . |
| 913836 | 12/1962 | United Kingdom . |

*Primary Examiner*—O. R. Vertiz
*Assistant Examiner*—Wayne A. Langel
*Attorney, Agent, or Firm*—Cushman, Darby & Cushman

[57] ABSTRACT

In order to be independent of the situation in regard to methane and natural gas and at the same time to obtain a heating gas there is employed in the hydrocyanic acid-methane-ammonia process (the BMA process) in place of methane an alkanol or alkanediol having 2–4 carbon atoms, preferably ethyl alcohol, and this is reacted with ammonia in a C:N ratio of 0.8:1 to 2:1. Optionally additional hydrogen can be present.

16 Claims, 1 Drawing Figure

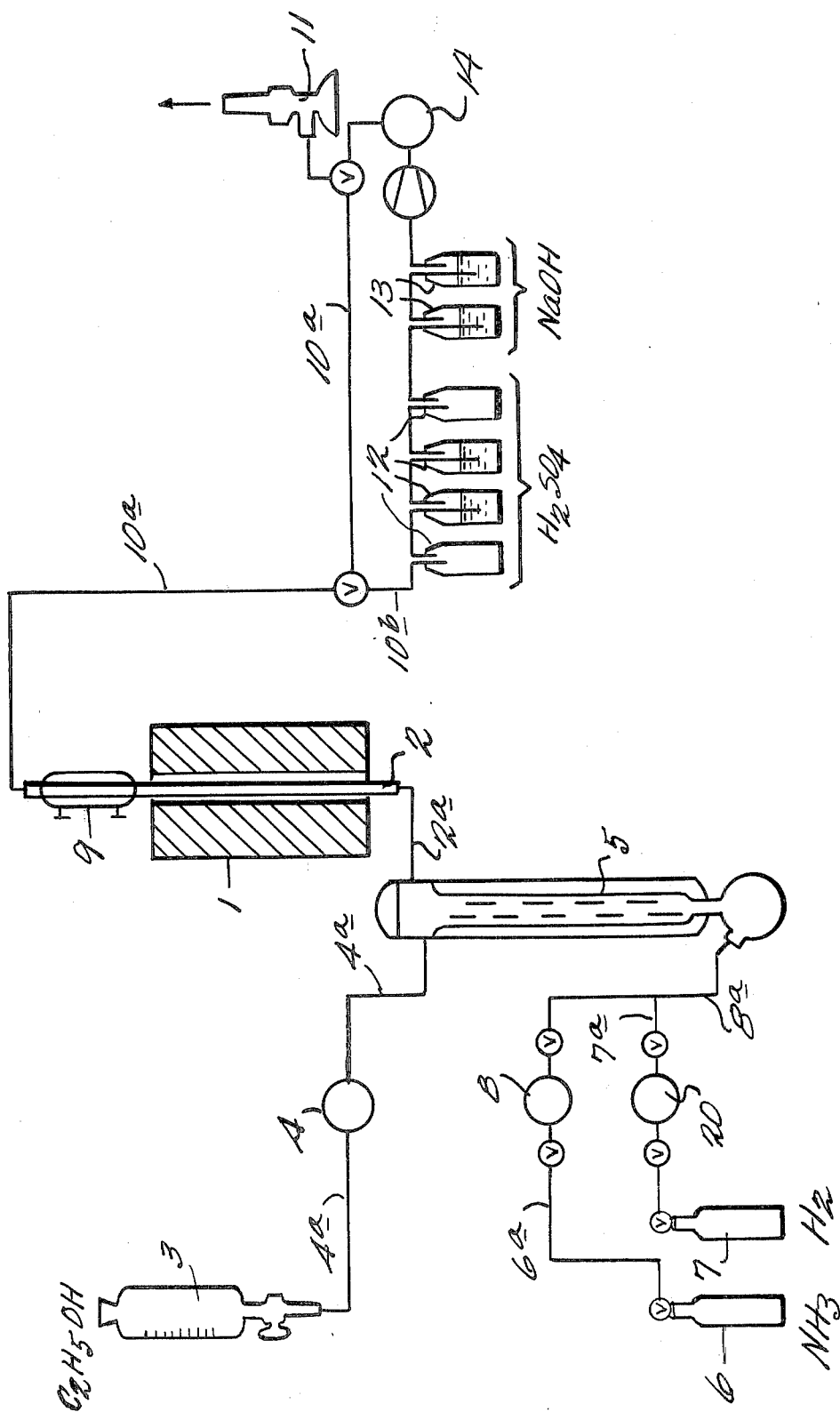

PROCESS FOR THE PRODUCTION OF HYDROGEN CYANIDE

BACKGROUND OF THE INVENTION

As is known the so-called BMA process for the production of hydrogen cyanide or hydrocyanic acid starts from methane and ammonia and operates in the absence of oxygen or air.

The reaction is carried out in suspended reaction tubes made of sintered aluminum oxide which are coated internally with a platinum catalyst.

Since the reaction proceeds endothermically the reaction tubes are heated and thereby there are maintained reaction temperatures of around 1300° C. In order to avoid the occurrence of the reverse reaction the hydrogen cyanide containing gaseous mixture must be quickly cooled to temperatures below 400° to 300° C. This takes place in a water cooled chamber made of aluminum in the top of the furnace itself, see Ullmann, Enzyklopadie der technischen Chemie, 4th edition Vol. 9, pages 657–660, especially page 659; Dechema, Monograph (1959) Vol. 33 pages 28 to 46 and also German Pat. No. 959,364 and related but not identical Endter U.S. Pat. No. 2,987,382.

Since the reaction proceeds endothermically there is needed besides the synthesis gas a large amount of hot gas which makes the BMA process directly dependent on a supply of methane or natural gas. Therefore it is not suited for every situation.

As is described in German OS 2913925 and related Voigt U.S. application Ser. No. 133,358 filed Mar. 24, 1980 and now Pat. No. 4,289,741 this disadvantage is eliminated by the use of liquified gases as alternative sources of carbon.

It would be particularly favorable if besides easily transportable and storable carbon compounds there could be employed carbon compounds which produce a residual gas in the reaction with ammonia whose heat value is sufficient to supply the largest part of the energy needed for the reaction.

SUMMARY OF THE INVENTION

It has now been found that this object can be attained if there is reacted in obtaining hydrogen cyanide according to the hydrocyanic acid-methane-ammonia process in place of methane an aliphatic alcohol, e.g. an alkanol or alkanediol, having 2–4 carbon atoms or a mixture of such alcohols with ammonia at a charging atomic ratio C:N of 0.8:1 to 2:1, in a given case in the presence of additional hydrogen, the unreacted ammonia separated off and the resulting gaseous mixture separated into hydrogen cyanide and residual gas.

As aliphatic alcohols there can be used the lower alcohols such as e.g. ethyl alcohol, propyl alcohols, e.g. n-propyl alcohol and isopropyl alcohol and butyl alcohols, e.g. n-butyl alcohol, isobutyl alcohol, sec. butyl alcohol and t-butyl alcohol or diols such as butanediol, e.g. butanediol-1,4, butanediol-1,2, butanediol-1,3, ethylene glycol, propanediol-1,2 or propanediol-1,3.

Especially preferred is ethyl alcohol, both in technical and pure form.

The aliphatic alcohol and ammonia, which is used in its customary gaseous form in the BMA process, are employed in such amounts that the C:N atomic ratio is 0.8:1 to 2:1, preferably 1.4:1 to 1.8:1. There has proven very favorable an atomic ratio of 1.4:1 to 1.6:1, since in the range only moderate carbon black formation occurs and the use of additional hydrogen was not necessary. The yields of HCN amounted to e.g. 94% HCN, based on one carbon atom of the ethyl alcohol employed, or 74% HCN based on ammonia.

The formation of carbon black, however increases with increasing C:N ratio. It would lead to a deactivation of the contact within a short time and to drastic lose in yields.

However, this type of deposition of carbon particles is suppressed by the use of additional hydrogen.

Such a procedure is not absolutely necessary in the lower range of C:N ratio from about 1.5:1, however, even in this case it effects a saving of the contact.

If the C:N ratio increases to a value above 1.8:1 then it is recommended to feed in at least 1 mole of hydrogen per mole of ammonia.

Thus there result favorable yields, e.g. at a ratio of 2:1 about 93% HCN based on one carbon atom of the ethyl alcohol employed, or 91% HCN based on ammonia, without carbon black formation occurring.

The process of the invention does not require any special pretreatment of the starting material, as e.g. completely drying.

Thus there can be employed with good results alcohols containing up to 10 weight percent of water, likewise ammonia with up to 5 weight % of water.

The process of the invention therefore can be carried out in existing BMA plants without modification.

However, it is especially favorable that the residual gas resulting after the separation of the hydrogen cyanide, which residual gas besides hydrogen has a high CO content, can be used immediately as heating gas and therewith partially or completely take care of the heat requirements of the reaction.

Since the BMA process operates without oxygen and therefore is particularly susceptible to carbon black formation, it could not be foreseen that this process could be carried out without great technical difficulties with alcohols, above all ethyl alcohol, as the carbon source and that the residual gas resulting thereby can be used in such a favorable manner for the process.

The reaction is carried out under the customary temperature and pressure conditions of the BMA synthesis.

Thus for examples there are employed noble metals, e.g. platinum, as the catalyst. The temperature of the reaction is generally from above 1000° C., e.g. 1050° C. or higher up to about 1300° C. and the pressure is usually about 1 to 1.5 bar. After passing through the reaction tube the reaction gas mixture formed is quickly cooled, e.g. to a temperature below 400° C. as indicated above.

Unless otherwise indicated all parts and percentages are by weight.

The process can comprise, consist essentially of or consist of the steps set forth with the materials mentioned.

BRIEF DESCRIPTION OF THE DRAWING

The single FIGURE of the drawings shows an apparatus in schematic form suitable for carrying out the process of the invention.

DETAILED DESCRIPTION

The numerals 2a, 4a, 6a, 7a and 8a indicate lines.

The reaction takes place in a heatable reactor 1 in the interior of which there is located the ceramic contact tube 2.

The alcohol is led from the supply vessel 3 by means of metering pump 4 into the vaporizer 5 and there is mixed with the gases from the supply flasks 6($NH_3$) and 7($H_2$) via the regulator 8.

After the synthesis the product gas in the condenser 9 is brought quickly to a temperature below 100° C. and via line 10a is taken care of in burner 11.

For an analytical evaluation in the bypass via line 10b the unreacted ammonia is caught in the absorption receivers 12 which are filled with sulfuric acid and analyzed by wet chemistry in known manner.

The hydrogen cyanide formed is absorbed in the two receivers 13 filled with soda lye and likewise analyzed by wet chemistry in known manner as sodium cyanide.

The residual amount of gas via gas meter 14 is determined quantitatively and its composition analyzed by means of gas chromatography.

In order to be able to evaluate the quality of a given contact before and after carrying out the process of the invention in each case at the beginning and at the end of a series of experiments there is carried out the synthesis according to the customary BMA process, i.e. with methane and ammonia.

A deactivation of contact, e.g. by carbon black formation, in such a case would effect yield reduction in standard process.

Experiments with changing C:N ratios are expressly given in the example for ethanol and collected in Table 1.

Thereby column I means the number of the experiment, column II the C:N ratio, column III the duration of the experiment in hours, in the cummulative series of experiments, column IV the yield in weight % based on 1 carbon atom of the alcohol employed (the second carbon atom is recovered in the residual gas as CO) and on the ammonia employed. In column V there is reported the gas, chromatographically determined residual gas analysis, in column VI the amount of residual gas in liters.

The comments on the experimental results are set forth in column VII whereby an increasing number of crosses symbolizes an increasing formation of carbon black.

The quality control of the contact (customary BMA contact) is read from the data "standard before" and "standard after."

The favorable influence of hydrogen for the process of invention can be seen from the comparison of experiment 30–45 to experiment 29.

The process of the invention will be described with the aid of the following examples.

In the examples the catlayst was platinum, the temperature of reaction 1300° C. and the pressure 1 bar.

EXAMPLE 1–45

There was reacted in the BMA apparatus described a gaseous mixture consisting of ethanol, ammonia and, in some cases, hydrogen and the mixture analyzed. The molar composition of the individual gases as well as the analytical evaluation are collected in Table 1 and are commented on there. The molar throughput was 1 mole of ammonia per hour.

EXAMPLE 46

There was reacted in an apparatus similar to that used in Examples 1–45 a gaseous mixture whose molar composition consisted of 0.33 mole propanol-2 and 1 mole of $NH_3$ per hour. The yield was 74.85% based on ⅔ of the carbon atoms employed and 49.9% based on ammonia. A third of the carbon employed is found again in the residual gas, in the gas chromatographic analysis there was detected 6.1% $N_2$, 12.16% CO and 81.74% $H_2$ (Difference to 100%).

EXAMPLE 47

The procedure was analogous to Example 46 but there were used 0.25 mole of isobutanol and 1 mole of ammonia per hour.

The yield was 52.4%, based on ¾ of the carbon atoms employed and 39.3% based on ammonia. A quarter of the carbon employed was found again in the residual gas, in the gas chromatographic analysis there were detected 7.62% $N_2$, 8.72% CO and 83.66% $H_2$ (Difference to 100%).

The entire disclosure of German priority application P3036599.2-41 is hereby incorporated by reference.

TABLE 1

Experiments With Ethanol

| I Experiment No. | II Ratio C:N | III Duration hours (cumulative) | IV Yield % based on 1 C | V Residual analysis Vol % $NH_3$ | $H_2$ | $CH_4$ | CO | VI Residual gas l | VII Carbon black formation +slight ++average +++heavy |
|---|---|---|---|---|---|---|---|---|---|
| 1 | $CH_4$ | 1 | 99.03 | 95.22 | — | — | — | 80.3 | Standard before |
| 2 | 1.57:1 | 2.5 | 82.69 | 64.81 | 77.3 | 0.2 | 17.1 | 243.4 | |
| 3 | 1.58:1 | 5.0 | 94.08 | 74.3 | 77.1 | 0.1 | 17.2 | 247.9 | + |
| 4 | 1.58:1 | 7.5 | 90.52 | 71.5 | 75.9 | 0.1 | 16.8 | 258.5 | + |
| 5 | 1.58:1 | 10.0 | 92.24 | 72.9 | 76.6 | 0.1 | 17.2 | 265.5 | + |
| 6 | 1.58:1 | 12.5 | 87.78 | 69.4 | 77.8 | 0.3 | 17.1 | 233.5 | + |
| 7 | 1.57:1 | 15.0 | 93.04 | 72.9 | 77.8 | 0.1 | 17.2 | 261.9 | + |
| 8 | 1.58:1 | 17.5 | 85.78 | 67.8 | 76.1 | 0.4 | 16.8 | (231.4) | + |
| 9 | 1.59:1 | 20.0 | 85.05 | 67.8 | 76.5 | 0.1 | 17.5 | 269.5 | + |
| 10 | 1.57:1 | 22.5 | 87.56 | 68.6 | 76.0 | 0.3 | 16.5 | 261.7 | + |
| 11 | 1.58:1 | 25.0 | 92.13 | 72.8 | 77.4 | 0.1 | 16.8 | 268.6 | + |
| 12 | 1.58:1 | 27.5 | 91.87 | 72.6 | 77.1 | 0.1 | 16.6 | 268.3 | + |
| 13 | 1.57:1 | 30.0 | 87.22 | 68.3 | 76.6 | 0.2 | 17.0 | 258.9 | + |
| 14 | $CH_4$ | 1 | 100 | 96 | — | | | 81.2 | Standard after |
| 15 | $CH_4$ | 1 | 90.2 | 86.7 | — | | | 78.4 | Standard before |
| 16 | 1.4:1 | 2.5 | 78.61 | 55.0 | 76.0 | 0.3 | 15.7 | 235.1 | none |
| 17 | 1.4:1 | 5.0 | 80.42 | 56.3 | — | — | — | 231.4 | none |

TABLE 1-continued

Experiments With Ethanol

| I Experiment No. | II Ratio C:N | III Duration hours (cumulative) | IV Yield % based on 1 C | V Residual analysis Vol % | | | | VI Residual gas 1 | VII Carbon black formation +slight ++average +++heavy |
|---|---|---|---|---|---|---|---|---|---|
| | | | | $NH_3$ | $H_2$ | $CH_4$ | CO | | |
| 18 | 1.4:1 | 7.5 | 81.37 | 57.0 | — | — | — | 237.6 | none |
| 19 | 1.4:1 | 10.0 | 82.54 | 57.8 | — | — | — | 241.1 | + |
| 20 | 1.4:1 | 12.5 | 76.77 | 53.8 | 76.2 | 0.4 | 15.3 | 234.0 | + |
| 21 | 1.4:1 | 15.0 | 80.76 | 56.6 | — | — | — | 240.5 | + |
| 22 | 1.4:1 | 17.5 | 83.95 | 58.8 | 78.9 | 0.2 | 16.0 | 241.7 | + |
| 23 | 1.4:1 | 20.0 | 87.72 | 61.5 | — | — | — | 248.5 | + |
| 24 | 1.4:1 | 22.5 | 82.37 | 57.7 | — | — | — | 244.2 | none |
| 25 | 1.4:1 | 25.0 | 76.68 | 53.7 | 76.8 | 0.3 | 15.4 | 235.6 | none |
| 26 | 1.4:1 | 27.5 | 72.28 | 50.7 | — | — | — | 230.1 | none |
| 27 | 1.4:1 | 30.0 | 72.21 | 54.1 | 77.1 | 0.1 | 15.2 | 236.9 | none |
| 28 | $CH_4$ | 1 | 99.0 | 95.2 | — | — | — | 83.4 | Standard afterwards |
| 29 | 2:1 | 2 | 79.14 | 76.85 | — | — | — | 305 | +++ |
| 30 | 1.96:1 + $\frac{0.5 \text{ Mol } H_2}{\text{Mol } C_2H_5OH}$ | 2 | 90.25 | 85.02 | 79.1 | 0.2 | 17.1 | 260.2 | + |
| 31 | 1.96:1 + $\frac{1 \text{ Mol } H_2}{\text{Mol } C_2H_5OH}$ | 2 | 90.23 | 85.07 | 80.4 | 0.1 | 16.0 | 272.7 | none |
| 32 | $CH_4$ | 1 | 99.11 | 95.3 | — | — | — | 83.4 | Standard before |
| 33 | 1.95:1 + $\frac{1 \text{ Mol } H_2}{\text{Mol } C_2H_5OH}$ | 2.5 | 90.20 | 84.67 | — | — | — | 352.6 | none |
| 34 | 1.95:1 + $\frac{1 \text{ Mol } H_2}{\text{Mol } C_2H_5OH}$ | 5.0 | 91.17 | 85.58 | 79.5 | 0.1 | 19.9 | 344.8 | none |
| 35 | " | 7.5 | 91.91 | 86.28 | — | — | — | 348.8 | " |
| 36 | " | 10.0 | 91.08 | 85.49 | 80.9 | 0.2 | 16.1 | 341.6 | " |
| 37 | " | 12.5 | 91.52 | 85.91 | — | — | — | 349.9 | " |
| 38 | " | 15.0 | 89.35 | 83.87 | 80.2 | 0.2 | 16.5 | 343.5 | " |
| 39 | " | 17.5 | 91.75 | 86.13 | — | — | — | 354.2 | " |
| 40 | " | 20.0 | 91.21 | 85.63 | 81.3 | 0.1 | 16.1 | 346.5 | " |
| 41 | " | 22.5 | 91.31 | 85.71 | — | — | — | 351.9 | " |
| 42 | " | 25.0 | 91.11 | 85.52 | 80.6 | 0.1 | 15.9 | 350.4 | " |
| 43 | " | 27.5 | 91.14 | 85.56 | — | — | — | 348.9 | " |
| 44 | " | 30.0 | 89.92 | 84.41 | 80.3 | 0.1 | 15.9 | 350.7 | " |
| 45 | $CH_4$ | 1 | 98.96 | 95.2 | — | — | — | 79.1 | Standard after |

What is claimed is:

1. In a process for obtaining hydrogen cyanide by reaction of a carbon containing compound with ammonia in the absence of oxygen in a ceramic tube coated internally with platinum metal or a platinum containing compound according to the conditions of the hydrocyanic acid-methane-ammonia process the improvement comprising employing in place of the methane as a reactant an aliphatic alcohol containing 2 to 4 carbon atoms and carrying out the reaction between the alcohol and ammonia employing an atomic ratio C:N of 0.8:1 to 2:1, removing unreacted ammonia and separating the hydrogen cyanide formed from residual gas.

2. A process according to claim 1 wherein the aliphatic alcohol is an alkanol or alkanediol.

3. A process according to claim 2 wherein the initial mixture consists essentially of ammonia and alkanol or alkanediol.

4. A process according to claim 2 wherein the initial mixture includes hydrogen in an amount sufficient to reduce the formation of carbon black.

5. A process according to claim 2 wherein the aliphatic alcohol contains up to 10 weight % of water.

6. A process according to claim 5 wherein the ammonia contains up to 5 weight % of water.

7. A process according to claim 2 wherein the ammonia contains up to 5 weight % of water.

8. A process according to claim 7 wherein the aliphatic alcohol is ethyl alcohol.

9. A process according to claim 6 wherein the aliphatic alcohol is ethyl alcohol.

10. A process according to claim 5 wherein the aliphatic alcohol is ethyl alcohol.

11. A process according to claim 2 wherein the aliphatic alcohol is ethyl alcohol.

12. A process according to claim 8 wherein the atomic ratio of C:N is from 1.4:1 to 1.8:1.

13. A process according to claim 12 wherein the atomic ratio of C:N is from 1.4:1 to 1.6:1.

14. A process according to claim 8 wherein the initial mixture includes hydrogen, the atomic ratio of C:N is from 1.8:1 to 2:1 and there is employed at least 1 mole of hydrogen per mole of ammonia.

15. A process according to claim 8 wherein after separation of ammonia and hydrogen cyanide the residual gas is used directly to heat the reaction furnace.

16. A process according to claim 15 wherein after separation of ammonia and hydrogen cyanide the residual gas is used directly to heat the reaction furnace.

* * * * *